United States Patent
Zeidler et al.

(10) Patent No.: US 6,791,622 B2
(45) Date of Patent: Sep. 14, 2004

(54) METHODS AND APPARATUS FOR PROVIDING VIDEO STILL FRAME AND VIDEO CAPTURE FEATURES FROM INTERLACED VIDEO SIGNALS

(75) Inventors: David E. Zeidler, Warrington, PA (US); Robert M. Simons, Lansdale, PA (US); Constance J. Borges, Churchville, PA (US)

(73) Assignee: General Instrument Corporation, Horsham, PA (US)

( * ) Notice: Subject to any disclaimer, the term of this patent is extended or adjusted under 35 U.S.C. 154(b) by 459 days.

(21) Appl. No.: 09/944,879

(22) Filed: Aug. 31, 2001

(65) Prior Publication Data

US 2003/0043297 A1 Mar. 6, 2003

(51) Int. Cl.[7] .................................................. H04N 5/44
(52) U.S. Cl. ........................ 348/559; 348/407; 348/415; 348/431
(58) Field of Search ................................. 348/559, 447, 348/407, 430, 431, 701, 910, 572, 620, 714, 715, 415, 402; H04N 5/44

(56) References Cited

U.S. PATENT DOCUMENTS

| | | | |
|---|---|---|---|
| 4,272,787 A | | 6/1981 | Michael et al. |
| 4,679,084 A | | 7/1987 | Topper et al. |
| 4,761,686 A | | 8/1988 | Willis |
| 4,853,765 A | | 8/1989 | Katsumata et al. |
| 5,019,908 A | | 5/1991 | Su |
| 5,191,413 A | | 3/1993 | Edgar |
| 5,497,237 A | * | 3/1996 | Hosokawa et al. ............ 386/8 |
| 6,317,165 B1 | * | 11/2001 | Balram et al. .............. 348/699 |

FOREIGN PATENT DOCUMENTS

| | | |
|---|---|---|
| EP | 0 371 678 | 6/1990 |
| GB | 2 184 628 | 6/1987 |

OTHER PUBLICATIONS

*Patent Abstracts of Japan*, vol. 015, No. 428, Oct. 30, 1991, Abstract of Japanese Patent "Frame/Field Automatic Changeover Device in Still Picture", Publication No. 03179889, Aug. 5, 1991, Japanese Application No. 01317550, Filed Dec. 8, 1989.

*Patent Abstracts of Japan*, vol. 012, No. 281, Aug. 2, 1988, Abstract of Japanese Patent "Video Disk Device", Publication No. 63059180, Mar. 15, 1988, Japanese Application No. 61201429, Filed Aug. 29, 1986.

* cited by examiner

*Primary Examiner*—Michael H. Lee
*Assistant Examiner*—Trang U. Tran
(74) *Attorney, Agent, or Firm*—Barry R. Lipsitz; Douglas M. McAllister

(57) ABSTRACT

Methods and apparatus for reducing the artifacts associated with still frame display and video capture of interlaced video are provided. Tuner 100 receives an interlaced video signal having an image frame with first and second fields. Motion detector 55 detects whether motion is present between the first and second fields. Memory 40 stores one or both of the fields for processing when motion is detected. Processor 30 processes the stored field(s) to provide an image frame with reduced artifacts. Various processing techniques are provided to generate the image frame from the stored field(s), without duplicating the stored field for use as the other field. Memory 40 stores the image frame. If motion is not detected, the first and second fields are both stored to provide the image frame. The stored image frame can then be continuously displayed to provide still frame display, or can be captured for subsequent use.

32 Claims, 4 Drawing Sheets

|  | Field 1 |  | Field 2 | Full Image |  |
|---|---|---|---|---|---|
| Line 1 | ———— | Line 2 | ------------ | ———— | Line 1 |
|  |  |  |  | ------------ | Line 2 |
| Line 3 | ———— | Line 4 | ------------ | ———— | Line 3 |
| Line 5 | ———— | Line 6 | ------------ | ------------ | . |
|  | . |  | . | ———— |  |
|  | . |  | . | ------------ | . |
|  | . |  | . |  | . |
| Line 477 | ———— | Line 478 | ------------ | ———— |  |
|  |  |  |  | ------------ |  |
| Line 479 | ———— | Line 480 | ------------ | ———— | Line 479 |
|  |  |  |  | ------------ | Line 480 |

FIG. 1

METHODS AND APPARATUS FOR PROVIDING VIDEO STILL FRAME AND VIDEO CAPTURE FEATURES FROM INTERLACED VIDEO SIGNALS

BACKGROUND OF THE INVENTION

The present invention relates to the field of digital signal processing. More particularly, the present invention relates to specific digital signal processing algorithms for reducing the artifacts associated with still frame display and video capture of interlaced video.

Most, if not all, analog broadcast video, and some digital video, is created and transmitted in interlaced video format. FIG. 1 illustrates the interlaced video format. "Interlaced" means that an image (i.e., a picture or a frame), is broken up into two fields, usually referred to as "field 1" and "field 2" or "odd field" and "even field." Each field contains one-half of the lines of video information (e.g., analog waveform or digital pixels) which make up the full image. Field one is displayed first on the screen, and contains one-half of the video image lines (e.g., the odd numbered lines) in the vertical direction. Field two is then displayed, containing the remaining one-half of the lines of the image (e.g., the even numbered lines). The lines of field two are displayed in-between the lines of field one. Together, the lines of field one and field two make up the entire picture or frame. In live video construction, the second field is time displaced from the first field by $1/60$ of a second when a frame rate of 30 frames per second is used. Therefore, motion in the video source will be present in the displayed picture between the two fields.

In advanced set-top terminals used, e.g., for receiving television signals in a cable or satellite television system, video still frame and video capture are important features. There are several potential constraints and trouble spots associated with the implementation and resulting image quality with both still frame display and video capture features.

Video still frame display means that the user can initiate the set-top terminal to stop displaying continuous video, and display the presently displayed single image continuously. This feature is similar to the pause feature on a VCR. Field to field motion and significant brightness changes between adjacent lines of the two fields are significant problems for image quality when implementing a video still frame display feature. The still frame captured and being displayed will be presented as field one followed by field two, repeated continuously. If there is motion between field one and field two, this motion will cause a jittering effect when continuously displayed as a still frame. For instance, if the still frame contains motion in a person's hand, the resulting still display will show the hand moving back and forth at a 60 Hertz rate. If the still frame contained a hard scene change, the resulting still image display would be almost unrecognizable with a great deal of 60 Hertz flicker. In addition, significant brightness changes between adjacent lines of the two fields will result in a flickering effect.

Video capture means that the user can acquire an image from live video. The captured image can be re-formatted as any standard type image format, such as a computer file in one of the standard .tif, .bmp, or .jpg formats, etc., and is usually de-interlaced in the process. This captured image can then be utilized in various ways (e.g., attached to an outgoing e-mail). If both fields are used for the video capture feature, the problem of inter-field motion is encountered. This is due to the second field being time displaced from the first field during construction and display. Motion occurring between the two fields will result in a blurred image, where more motion causes a blurrier captured image. If the motion present between fields is severe enough, for instance a hard scene change, the resulting captured image can be almost unrecognizable.

Due to the motion issue, and also to possibly save memory space, a single field can be utilized for video capture. However, as illustrated in FIG. 4, if just one of the two fields is utilized to make the image, the resulting image (e.g., first field image 210) will be squashed in the vertical direction, with adverse effects such as turning a circle into an egg.

It would be advantageous to provide methods and apparatus which compensate for the artifacts associated with still frame display and video capture techniques of interlaced video, including flicker and blurring artifacts. It would be further advantageous to provide for the reduction of such artifacts using specific algorithms.

The methods and apparatus of the present invention provide the foregoing and other advantages.

SUMMARY OF THE INVENTION

The present invention relates to methods and apparatus for reducing the artifacts associated with still frame display and video capture of interlaced video. A receiver is provided for receiving an interlaced video signal having an image frame with a first field and a second field. A motion detector for detecting whether motion is present between the first and second fields is provided. A field store memory is provided for storing the first field for further processing in the event motion is detected. A processor processes the stored first field to provide an image frame with reduced artifacts. Various processing techniques are provided to generate the image frame from the first field, without the need to duplicate the first field for use as the second field. Additionally both fields can be stored and processed to provide the reduced artifact image. An image store memory is provided for storing the image frame. In the event no motion is detected, the first field and the second field are both stored to provide the image frame. The stored image frame can then be continuously displayed to provide a still frame display, or can be captured for subsequent use (i.e., transferred to writeable media and reformatted).

BRIEF DESCRIPTION OF THE DRAWINGS

The present invention will hereinafter be described in conjunction with the appended drawing figures, wherein like numerals denote like elements, and:

FIG. 1 shows an example of an interlaced video frame;

DETAILED DESCRIPTION OF THE INVENTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing a preferred embodiment of the invention, it being understood that various changes may be made in the function and arrangement of elements without departing from the spirit and scope of the invention as set forth in the appended claims.

Figure 2:
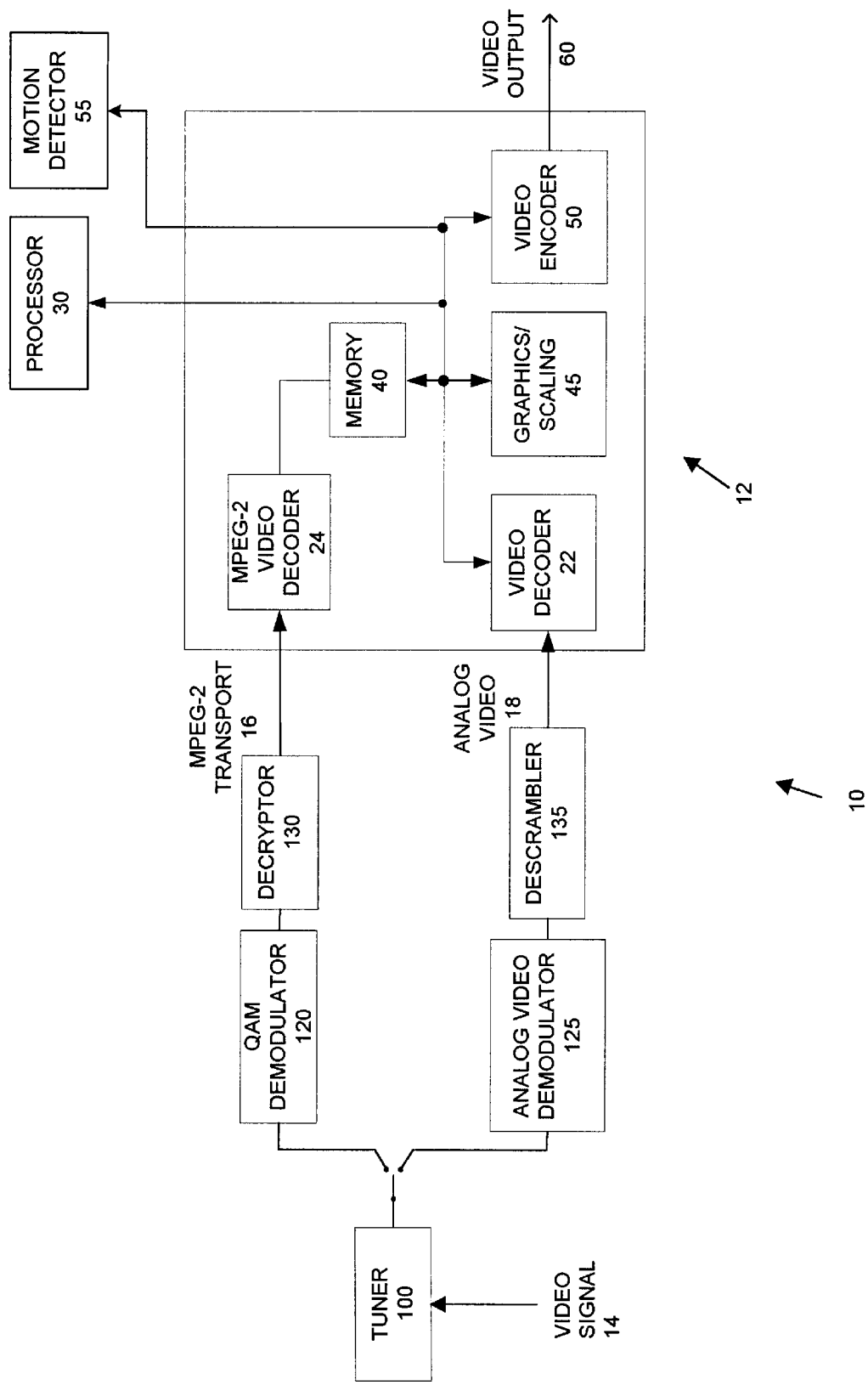
FIG. 2 shows a block diagram of an example embodiment of the invention.

The invention may be implemented in a set-top terminal as shown in FIG. 2. Those skilled in the art will appreciate that the invention may also be implemented as a stand-alone device adapted to receive a television (or other video or multimedia) signal, e.g., from a set-top terminal. In the alternative, the device functionality may be included as part of a television, a personal versatile recorder (PVR), a personal computer, a personal digital assistant (PDA), or similar device (either wired or wireless) having the capability to receive and decode a video signal.

FIG. 2 shows a set-top terminal generally designated 10 capable of receiving a video signal 14, which may comprise either an interlaced analog or digital signal. The invention may be implemented in a graphics system generally designated 12 of the settop terminal 10. The video signal is received at a tuner 100 in a conventional manner. In an embodiment where the video signal 14 is an analog signal, the tuner 100 provides the video signal to an analog video demodulator 125 and descrambler 135 for demodulating and descrambling in a conventional manner. The resultant analog video signal 18 is converted to a digital signal at decoder 22, which includes an analog to digital (A/D) converter (or more sophisticated digital decoder) at the front end thereof. The digital signal is then temporarily stored in the memory 40.

Where the video signal 14 is a digital signal, the tuner 100 provides the digital signal to demodulator 120 and decryptor 130 for demodulating and decrypting in a conventional manner. The digital signal (e.g., MPEG-2 transport stream 16) is decoded at decoder 24 and temporarily stored in memory 40.

A video encoder 50 in conjunction with a graphics/scaling processor 45 provides video output 60 for display in a conventional manner on a display device (e.g., a television).

In one embodiment of the invention as shown in FIG. 2, video still frame and video capture features from interlaced video signals (either analog or digital) are provided. A receiver (e.g., tuner 100) is provided for receiving an interlaced video signal 14 having an image frame with a first field and a second field. A motion detector 55 for detecting whether motion is present between the first and second fields is provided. A field store (e.g., memory 40) is provided for storing the first field for further processing in the event motion is detected. A processor 30 processes said stored first field to provide an image frame with reduced artifacts. An image store (e.g., memory 40) is provided for storing the image frame. During processing, the first field is not duplicated for use as the second field in the image frame. In the event no motion is detected, the first field and the second field are both stored. The stored image frame can then be used to generate a still frame display, or can be captured for subsequent use (i.e., as an attachment to an email message, etc.).

Those skilled in the art will appreciate that the motion detector 55 may be implemented as software or firmware in processor 30. Alternatively, a hardware solution can be provided, such as an application specific integrated circuit (ASIC). Motion detector 55 may detect motion on a per frame basis. Alternately, motion detector 55 may detect motion between respective pixels of two video frames.

Further, although the image store memory and field store memory are shown in FIG. 2 as memory 40, those skilled in the art will appreciate that the image store memory and field store memory may be implemented as separate memory devices, or as segmented portions of the same memory device. The memory device(s) may take a variety of forms, such as RAM, a hard drive, an optical disk, or any other suitable type of mass storage device, or combination of devices.

In addition, although the invention is described in connection with storing the first field for providing an image frame for still frame display or image capture, those skilled in the art will appreciate that either one of the fields may be treated as the stored field.

To generate a still frame display, the stored image frame is output from video encoder 50 and continuously displayed.

The stored image frame may be transferable to writeable media to enable video capture features. For video capture, the stored image frame may be reformatable as one of a JPEG file, a TIFF file, or a bit map file.

In one embodiment of the invention, the processor 30 recreates each pixel in each line of the second field based on a weighted sum of a plurality of source pixels from the first field, or vice-versa. This may be accomplished using a two dimensional digital filter to reconstruct the second field from the first field, or vice-versa.

Figure 3:
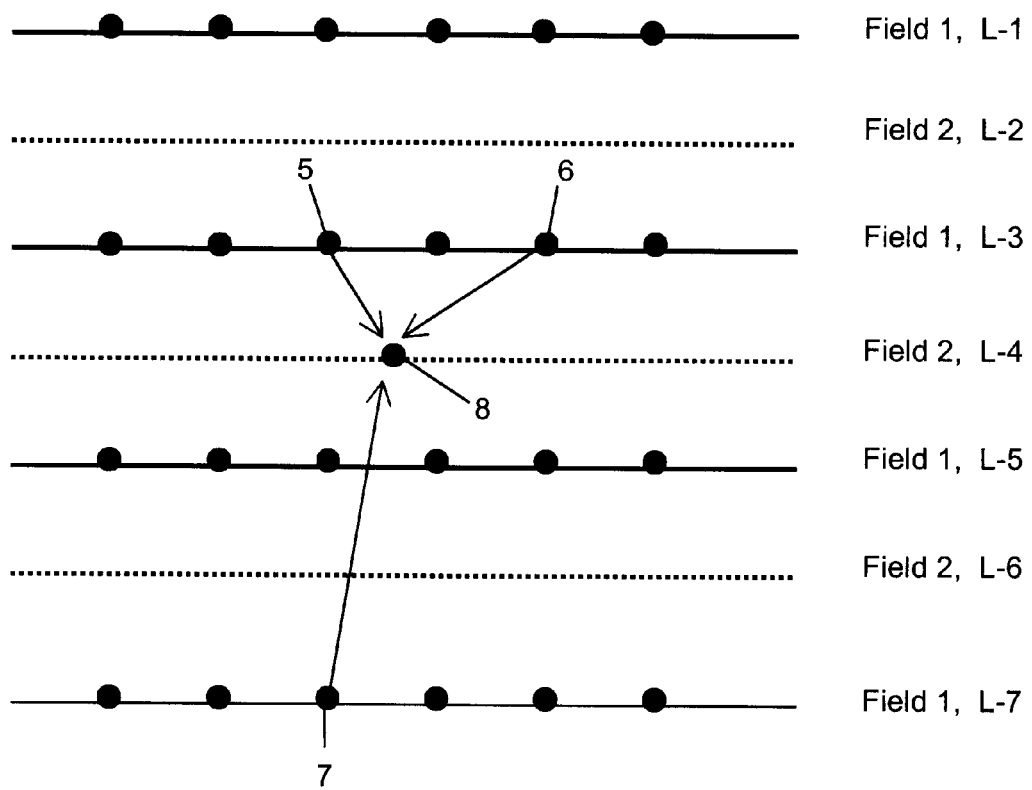
FIG. 3 shows a further embodiment of the invention.

As shown in FIG. 3, the weighted sum of source pixels may be obtained, e.g., from the first field in both the horizontal and vertical directions. The plurality of source pixels may be obtained from a plurality of lines of said first field. As an example, FIG. 3 shows a recreated pixel 8 in the second line of the second field (Field 2, L-4). The lines of the second field are shown as dashed lines, while the lines of the first field are shown as solid lines. Pixel 8 is recreated from a weighted sum of: source pixel 5 from Field 1, L-3; source pixel 6 from Field 1, L-3; and source pixel 7 from Field 1, L-7. Those skilled in the art will appreciate that a variety of combinations of source pixels from a variety of lines of the first field may be used to recreate each pixel of the lines of the second field. Further, although three source pixels are shown in FIG. 3 for the recreation of pixel 8 in the second field, the number of source pixels required to recreate a pixel in the second field may vary, depending on the implementation. For example, for higher resolution images, additional source pixels may be used. Moreover, it should be appreciated that a variety of combinations of source pixels from a variety of lines of the second field may be used to recreate each pixel of the lines of the first field, instead of the other way around as illustrated.

In a further embodiment of the invention, the second field is stored in the field store memory 40 for further processing in the event motion is detected. In this embodiment, each pixel in each line of the second field may be recreated based on a weighted sum of a plurality of source pixels from the first field and the second field. The weighted sum of source pixels may be obtained from the first field and the second field in both the horizontal and vertical directions. The plurality of pixels may be obtained from a plurality of lines of said first field and said second field.

A two dimensional digital filter may be used to recreate a modified second field from the first field and the second field, or vice-versa.

Figure 4:
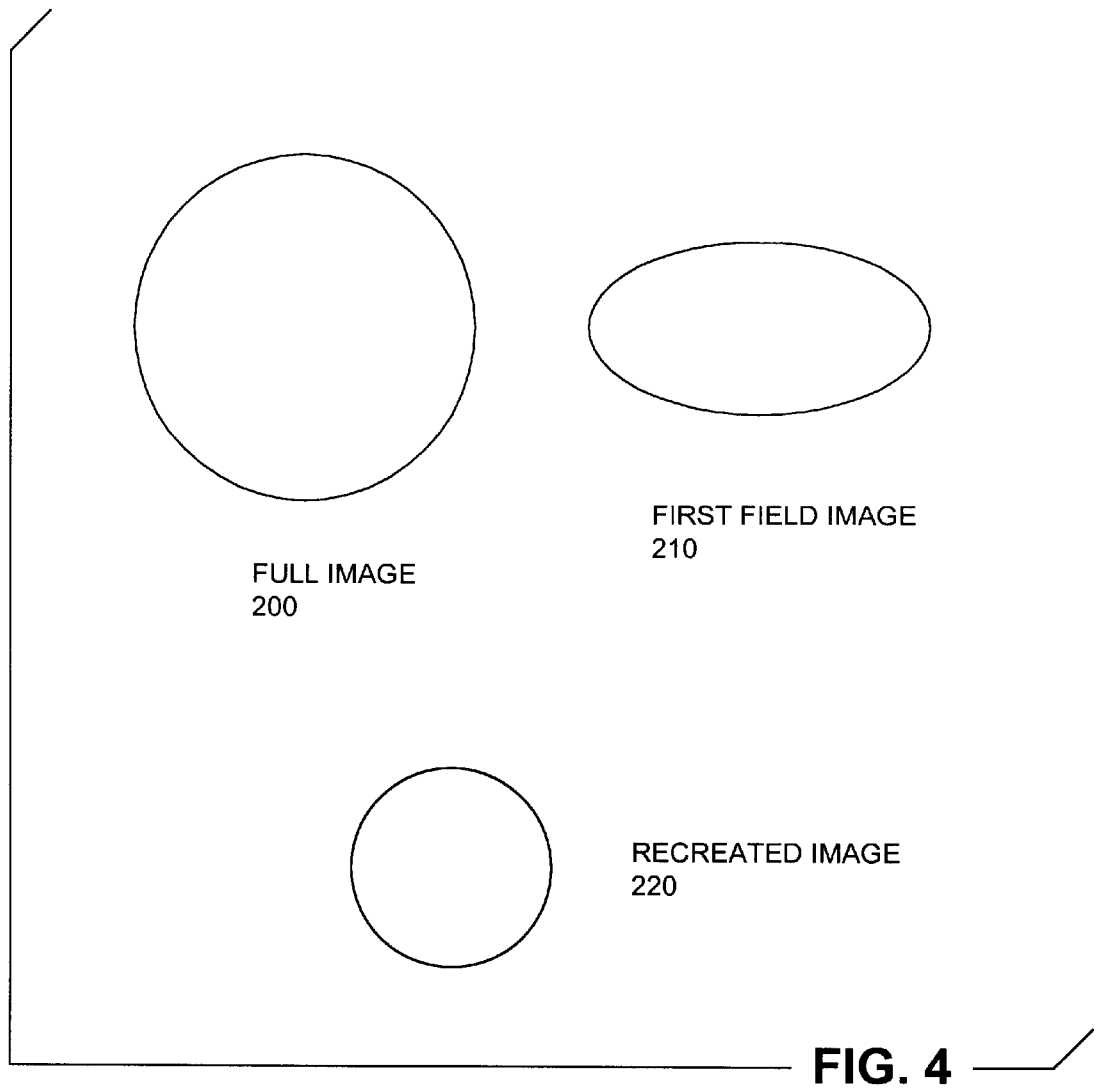
FIG. 4 shows an alternate embodiment of the invention.

Alternately, only the first field may be utilized to obtain an image suitable for video capture, without recreating the second field. As shown in FIG. 4, a single field provides an image 210 which is compressed in the vertical direction as compared to the full image 200 provided by the first and second fields. Therefore, the image generated by the first field must be processed to provide an image with a corrected aspect ratio. In one embodiment, the processor 30 re-sizes the first image 210 created by the first field to produce a second image 220 with a corrected aspect ratio. The re-sized image may be of equal or lesser size than the full image 200, and the resolution of the re-sized image will be less than that of the full image 200. In an alternate embodiment, the processor sub-samples pixel data points from the first field 210 in the horizontal direction. Sub-sampling in the horizontal direction will result in a recreated image 220 which is one-half the size of the original image. This recreated image 220 will also have a lower resolution than the full image 200.

In the above-described embodiments of the invention, the first field and the second field may make up an image frame. Alternately, the first field and the second field may make up a portion of an image frame.

Corresponding methods for video still frame display and video capture are also provided by the present invention.

It should now be appreciated that the present invention provides advantageous methods and apparatus for reducing artifacts inherent in standard still frame display and video capture techniques used with interlaced video.

Although the invention has been described in connection with various illustrated embodiments, numerous modifications and adaptations may be made thereto without departing from the spirit and scope of the invention as set forth in the claims

What is claimed is:

1. A method for providing video still frame and video capture features from interlaced video signals, comprising the steps of:

receiving an interlaced video signal having an image frame with a first field and a second field;

comparing said first field and said second field to determine whether motion is present between said first field and said second field, and in the event motion is present:

storing one of said fields for further processing;

processing the stored field to provide an image frame with reduced artifacts, without duplicating the stored field for use as the other field of the image frame; and storing said image frame;

wherein:

in the event no motion is detected, both of the first and second fields are stored for use as the image frame.

2. A method in accordance with claim 1, comprising the further step of continuously displaying the stored image frame.

3. A method in accordance with claim 1, comprising the further step of transferring said stored image frame to writeable media.

4. A method in accordance with claim 1, comprising the further step of reformatting the stored image frame as one of a JPEG file, a TIFF file, or a bit map file.

5. A method in accordance with claim 1, wherein said processing step comprises:

recreating each pixel in each line of the other field based on a weighted sum of a plurality of source pixels from the stored field.

6. A method in accordance with claim 5, wherein the weighted sum of source pixels is obtained from the stored field in both the horizontal and vertical directions.

7. A method in accordance with claim 5, wherein the plurality of source pixels are obtained from a plurality of lines of the stored field.

8. A method in accordance with claim 1, wherein said processing step comprises using a two dimensional digital filter to reconstruct the other field from the stored field.

9. A method in accordance with claim 1, further comprising:

additionally storing said other field for further processing in the event motion is detected; and recreating each pixel in each line of the other field based on a weighted sum of a plurality of source pixels from both fields.

10. A method in accordance with claim 9, wherein the weighted sum of source pixels is obtained from the stored field and the other field in both the horizontal and vertical directions.

11. A method in accordance with claim 9, wherein the plurality of source pixels is obtained from a plurality of lines of said stored field and said other field.

12. A method in accordance with claim 9, wherein said recreating step is performed using a two dimensional digital filter.

13. A method in accordance with claim 1, wherein said processing step comprises re-sizing a first image created by the stored field to produce a second image with a corrected aspect ratio.

14. A method in accordance with claim 1, wherein said processing step comprises sub-sampling pixel data points from the stored field in the horizontal direction.

15. A method in accordance with claim 1, wherein the first field and the second field make up an image frame.

16. A method in accordance with claim 1, wherein the first field and the second field make up a portion of an image frame.

17. An apparatus for providing video still frame and video capture features from interlaced video signals, comprising:

a receiver for receiving an interlaced video signal having an image frame with a first field and an second field;

a motion detector for comparing said first field and said second field to determine whether motion is present between said first field and said second field;

a field store memory for storing one of said fields for further processing in the event motion is detected; and a processor for processing the stored field to provide an image frame with reduced artifacts without duplicating the stored field for use as the other field of the image frame;

an image store memory for storing said image frame;

wherein:

in the event no motion is detected, both of the first and second fields are stored for use as the image frame.

18. Apparatus in accordance with claim 17, wherein the stored image frame is continuously displayed.

19. Apparatus in accordance with claim 17, wherein said stored image frame is transferable to writeable media.

20. Apparatus in accordance with claim 17, wherein the stored image frame is reformatable as one of a JPEG file, a TIFF file, or a bit map file.

21. Apparatus in accordance with claim 17, wherein said processor recreates each pixel in each line of the other field based on a weighted sum of a plurality of source pixels from the stored field.

22. Apparatus in accordance with claim 21, wherein the weighted sum of source pixels is obtained from the stored field in both the horizontal and vertical directions.

23. Apparatus in accordance with claim 21, wherein the plurality of source pixels are obtained from a plurality of lines of the stored field.

24. Apparatus in accordance with claim 17, wherein a two dimensional digital filter is used to reconstruct the other field from the stored field.

25. Apparatus in accordance with claim 17, wherein:
   said other field is additionally stored in said field store memory for further processing in the event motion is detected; and
   each pixel in each line of the other field is recreated based on a weighted sum of a plurality of source pixels from both fields.

26. Apparatus in accordance with claim 25, wherein the weighted sum of source pixels is obtained from the stored field and the other field in both the horizontal and vertical directions.

27. Apparatus in accordance with claim 25, wherein the plurality of source pixels is obtained from a plurality of lines of said stored field and said other field.

28. Apparatus in accordance with claim 25, wherein a two dimensional digital filter is used to recreate said other field.

29. Apparatus in accordance with claim 17, wherein said processor re-sizes a first image created by the stored field to produce a second image with a corrected aspect ratio.

30. Apparatus in accordance with claim 17, wherein said processor sub-samples pixel data points from the stored field in the horizontal direction.

31. Apparatus in accordance with claim 17, wherein the first field and the second field make up an image frame.

32. Apparatus in accordance with claim 17, wherein the first field and the second field make up a portion of an image frame.

* * * * *